UNITED STATES PATENT OFFICE.

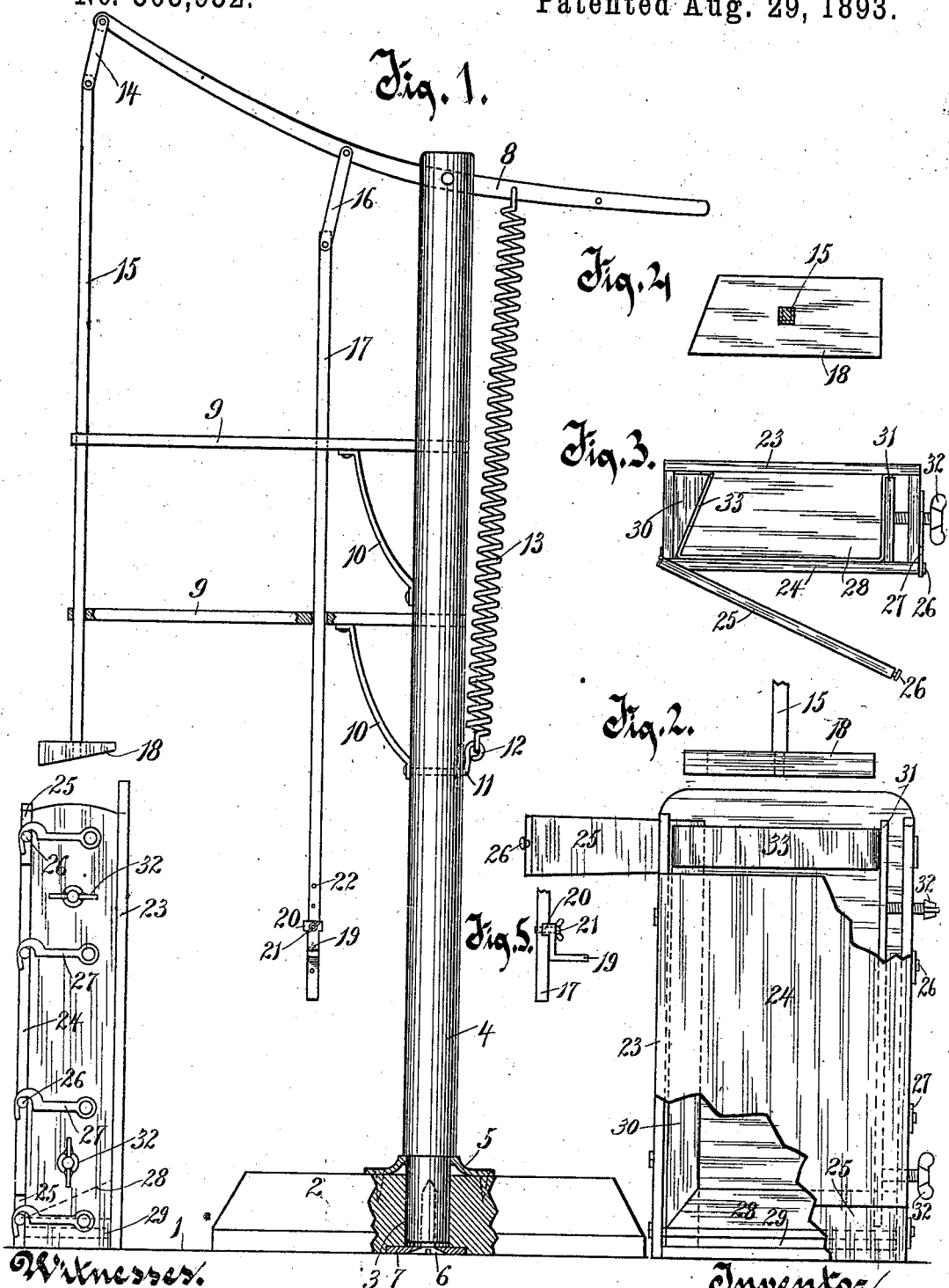

JOHN FATKA, OF RACINE, WISCONSIN.

STUFFING-MACHINE.

SPECIFICATION forming part of Letters Patent No. 503,952, dated August 29, 1893.

Application filed March 6, 1893. Serial No. 464,637. (No model.)

*To all whom it may concern:*

Be it known that I, JOHN FATKA, of Racine, in the county of Racine and State of Wisconsin, have invented new and useful Improvements in Stuffing-Machines, of which the following is a description, reference being had to the accompanying drawings, which are a part of this specification.

My invention has relation to improvements in stuffing machines particularly adapted for the stuffing of vehicle cushions.

The object had in view is to provide a machine in which the stuffing may be accomplished much more expeditiously than it is at present carried out by hand, and at the same time the stuffing material more evenly and firmly distributed.

With the above primary object in view the invention consists in the improved construction and combination of parts hereinafter more fully set forth.

In the accompanying drawings, Figure 1, represents the operating mechanism in side elevation, part being in section, and showing the edge of the receptacle for the stuffing material. Fig. 2, is a side elevation of the stuffing receptacle, parts being broken away, and one of the end sections of the cover open, and also showing the stuffing head with a fragment of its operating lever or arm. Fig. 3, is a view of the open end of the stuffing receptacle, one of the end sections of the cover being shown as partly open. Fig. 4, is a plan view of the stuffing head, the lever or arm operating the same being in section, and Fig. 5, is a fragment of the reciprocating treadle arm or rod, showing the adjustable step secured thereto.

Like numerals of reference denote like parts throughout the several views.

In the accompanying drawings the line indicated by the numeral 1 illustrates a suitable supporting medium.

The invention proper consists of two principal parts or sections, viz., the operating mechanism and the stuffing receptacle.

The numeral 2 indicates the base of the operating mechanism, which base is adapted to rest on the supporting medium. This base piece is provided with a central aperture 3, through which the reduced end of a standard 4 passes, said reduced end first passing through an apertured bracket 5, secured to the upper side of the base, the shoulder formed by the reduced end of the standard resting on top of the bracket. The head of a screw 6 is countersunk in a small plate 7, beneath the base piece, while the shank of this screw enters the end of the standard. Means are thus provided for the free turning of the standard, so as to shift the mechanism carried thereby to different positions.

Pivoted medially in the upper bifurcated end of the standard is a lever 8, while parallel guide bars 9, 9 project out from the standard at different points beneath this lever. Braces for these parallel bars are afforded by rods 10, 10, having their opposite ends secured to the standard and the bars, respectively. The bolt 11, which secures the lower end of brace 10, passes through the standard, and its end terminates in an eye 12, to which the lower end of a coiled spring 13 is attached, the upper end of said spring being secured to lever 8.

Connected to one end of the pivoted lever by means of a link 14 is a depending arm 15, while connected medially to the lever by a link 16 is a second depending arm 17. Both of these depending arms run through guide slots in the guiding bars 9, 9 and arm 15 carries upon its lower end a stuffing head 18. To the end of arm 17 is secured a step 19, the vertical member of said step being provided with side flanges 20 which bear against the edges of the arm. A set screw 21 passes through the face of the vertical member of the step, and is adapted to take into any of a series of openings 22 in the depending arm, whereby the step may be set at any desired height to suit the convenience of the operator.

The stuffing receptacle is indicated by the numeral 23. This receptacle has its upper end open, as clearly shown in Fig. 3, while one of its sides is closed by a cover, composed preferably of three sections, the central section being indicated by the numeral 24, and the end sections by the numerals 25, 25. Each of these sections of cover is provided upon one edge with pins 26, adapted to be engaged by hooks 27 secured to one of the side edges of the receptacle. Within the interior of the receptacle is arranged a series of blocks, which are adapted to rest against the closed end and the two side edges respectively. The inclined block at the end of the receptacle is designated by the numeral 28. If it is desired to decrease the length of the receptacle so as to adapt the same for cushions of less length, one or more blocks similar to 29 may be placed between block 28 and the end of the receptacle. The inclination of block 28 is for the purpose of securing the required taper for one end of the cushion.

The numeral 30 indicates a block on one side of the receptacle, said block being inclined as clearly shown in Fig. 3, in order to form the required taper or bevel to one side of the cushion, as ordinarily constructed. It will be understood, however, that if preferred this block may be made integral or in one piece with the side edge of the receptacle.

The opposite longitudinal or side block is designated by the numeral 31. By means of screws 32 passing through the corresponding side edge of the receptacle this block is adapted to be adjusted so as to accommodate the width of the receptacle to the different widths it is desired to make the cushions.

At the upper open end of the receptacle is arranged a flat spring 33, said spring bearing against the cover and having its ends bent down at right angles, said ends corresponding to the shape of the side blocks and passing back of the same. This spring serves the purpose of holding the side blocks in proper position.

In working my device all that is necessary is for the operator to depress the medial depending arm 17 by means of foot pressure upon the step. This will have the effect of turning lever 8 upon its pivot, and simultaneously bringing down depending arm 15, which carries the stuffing head. After these arms have been moved down to their full extent, the coiled spring 13 acting upon pivoted lever 8 will return said lever and the depending arms to their normal raised position. It is obvious that a counterweight on the lever, or other equivalent means, may be used in place of the spring. The stuffing receptacle is placed immediately below the depending arm 15, so that the open end of said receptacle will register with the stuffing head 18.

The leather to be stuffed is first sewed up complete excepting one end, which is left unsewed. This leather bag is placed within the receptacle, and a suitable amount of stuffing material placed therein. Upon the successive down movements of the depending arm 15, the stuffing head acts upon the material, and serves to evenly and firmly pack the leather covering to be filled, and as more of the stuffing material is placed within the covering from time to time the operation is continued until the stuffing is finally completed.

During the operation it may be advisable to open the end sections 25, 25 of the cover of the receptacle, so that the stuffing of the ends of the leather bag or covering may be watched during the progress of the work.

In practice I desire to locate four or more of the stuffing receptacles upon the supporting medium 1, so that when the stuffing in one receptacle is completed the standard can be swung around so as to bring the stuffing head in line to operate upon the next receptacle.

From the above description it will be seen that I provide a most simple and efficient device for the purpose intended, and one wherein the work may be accomplished with but a minimum of labor, and in a most efficient, thorough and expeditious manner.

Having thus described my invention, what I claim, and desire to secure by Letters Patent, is—

1. In a stuffing machine, the combination, of a standard, a lever pivoted thereto, an arm depending from the end of the lever and provided upon its lower end with a stuffing head, and a second arm intermediate the first-named arm and the pivotal point of the lever, said arm depending from the lever to one side of the center thereof at a point nearest the pivot, substantially as set forth.

2. In a stuffing machine, the combination of a standard, a lever pivoted thereto, depending arms connected to said lever by links, one of said arms provided with a stuffing head and the other with a step or treadle, parallel guiding bars projecting from the standard, and through which the depending arms pass, and means for returning the lever to its normal position after depression, substantially as set forth.

3. In a stuffing machine, the combination of a receptacle, having an open upper end, and one of its side edges inclined upon its inner side, a block arranged parallel to the opposite side edge of the casing, screws passing through said side edge and engaging the block, and operating mechanism carrying a stuffing head adapted to be passed into the receptacle, substantially as set forth.

4. In a stuffing machine, the combination of a receptacle, having an open upper end and a closed lower end, an inclined block against the inner side of said closed end, means for adjusting the position of said block to regulate the length of the receptacle, and operating mechanism carrying a stuffing head adapted to be passed into the receptacle, substantially as set forth.

5. In a stuffing machine, the combination of a receptacle having an open upper end, a longitudinal block arranged within the interior of said receptacle and parallel with one of the side edges, screws passing through said side edges and engaging the block for the purpose of adjusting the same, and a transverse spring arranged adjacent to the open end of the receptacle, said spring having its ends bent at right angles, one of said ends bearing against the adjustable block, and the opposite end against the side edge of the receptacle, and operating mechanism carrying a stuffing head adapted to pass into the receptacle, substantially as set forth.

In testimony whereof I affix my signature in presence of two witnesses.

JOHN FATKA.

Witnesses:
ARTHUR L. MORSELL,
C. T. BENEDICT.